United States Patent [19]

Beckert et al.

[11] 4,347,224

[45] Aug. 31, 1982

[54] CHEMICAL DISPENSER

[75] Inventors: Adolf F. Beckert, Woodbury; Dennis G. Winberg, Cottage Grove; Duane D. Nowlin, New Brighton, all of Minn.

[73] Assignee: Ecodyne Corporation, Lincolnshire, Ill.

[21] Appl. No.: 154,646

[22] Filed: May 30, 1980

[51] Int. Cl.³ .............................. B01F 1/00; B01F 3/12
[52] U.S. Cl. ................................ 422/277; 210/198.1; 422/278
[58] Field of Search ............... 422/261, 263, 274, 277, 422/278; 210/198 R

[56] References Cited

U.S. PATENT DOCUMENTS

| | | |
|---|---|---|
| 2,044,821 | 6/1936 | Urban . |
| 2,215,000 | 9/1940 | Isenberg ........................ 422/278 |
| 2,573,576 | 10/1951 | Klumb . |
| 2,624,619 | 1/1953 | Fletcher et al. . |
| 2,758,877 | 8/1956 | Gleason . |
| 2,971,825 | 2/1961 | Kersh . |
| 3,194,444 | 7/1965 | Hubert . |
| 3,306,709 | 2/1967 | Atkinson . |
| 3,469,696 | 9/1969 | Petrucci et al. . |
| 3,864,090 | 2/1975 | Richards . |
| 3,920,553 | 11/1975 | Cilento . |
| 3,935,106 | 1/1976 | Lipner . |
| 3,952,767 | 4/1976 | Farage . |

Primary Examiner—Bradley Garris
Attorney, Agent, or Firm—Charles M. Kaplan; Joel E. Siegel

[57] ABSTRACT

A dispenser for dissolving a solid chemical into a flowing liquid includes a refillable cartridge that is held in a removable housing. A small amount of the liquid is diverted and is flowed upwardly through the chemical to dissolve same. The dissolved chemical is mixed with the rest of the liquid in an apertured protrusion that extends above a small liquid outlet hole in the top of the cartridge. The protrusion directs the liquid flow toward the liquid outlet opening of the dispenser.

8 Claims, 2 Drawing Figures

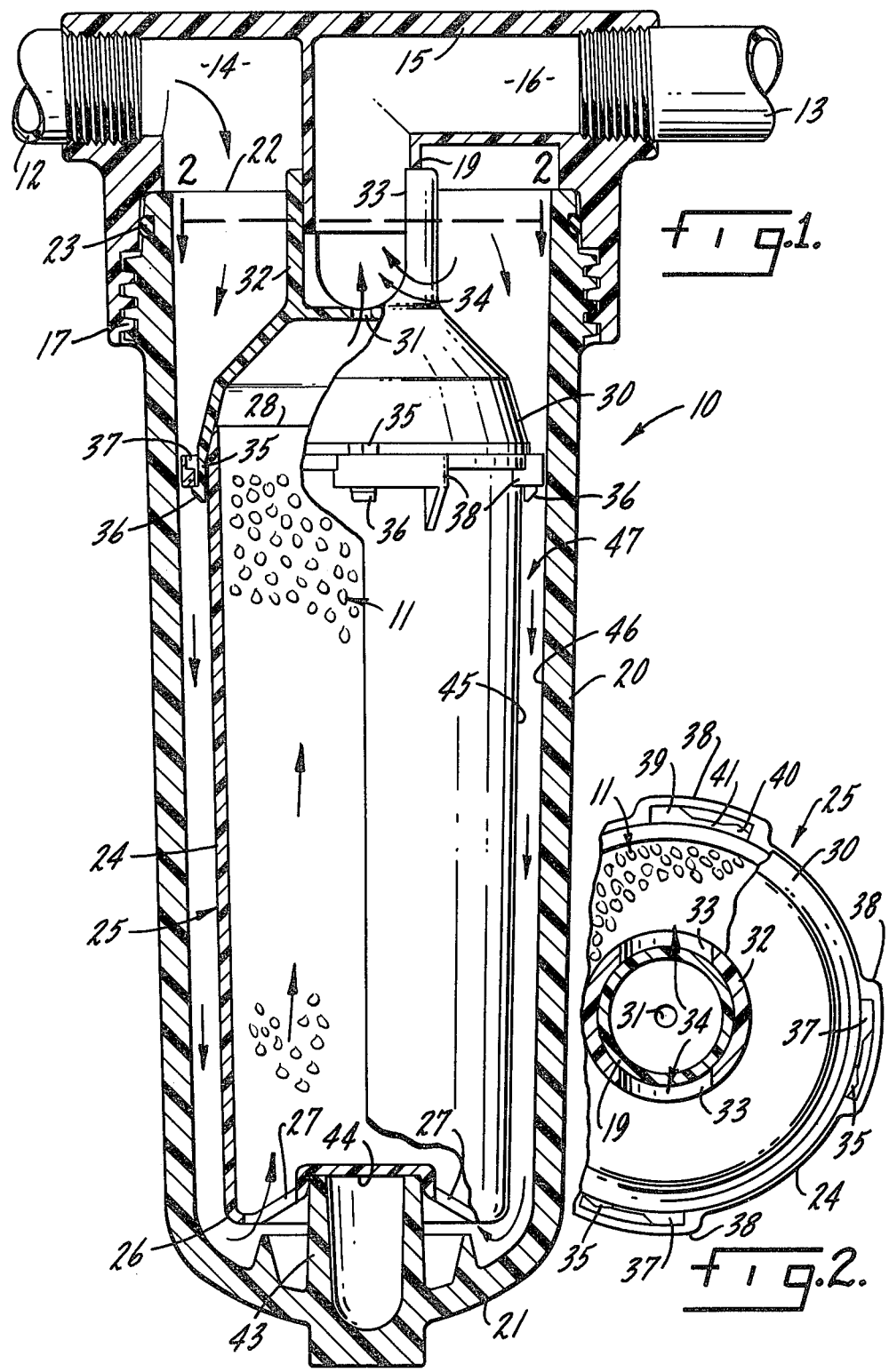

CHEMICAL DISPENSER

BACKGROUND OF THE INVENTION

This invention relates to the mixing of chemicals with liquids, and more particularly to dispensers for dissolving a solid chemical into a flowing liquid stream.

It is sometimes necessary to feed a small amount of chemical, such as a polyphosphate or sodium silicate, into a water supply to control corrosion, iron staining or scaling. This can be accomplished by diverting a part of the water through a dispenser that holds a supply of the chemical in solid form and then returning the diverted water and the chemical it has dissolved back to the main body of flowing stream of water. Serious problems have arisen because the dispensers used previously did not provide consistant chemical flow at a given liquid flow rate or at varying liquid flow rates. Also, such dispensers often discharged a surge of chemicals when the liquid flow was begun after having been shut down for several hours.

OBJECTIVES OF THE INVENTION

Accordingly, it is an object of this invention to provide improved chemical dispensing apparatus.

Another object is to provide a chemical dispenser that does not require the user to handle the chemical being dispensed.

Another object is to provide a recyclable cartridge for holding a dissolvable solid chemical.

Another object is to provide a dispenser that feeds dissolved chemical into a flowing stream of liquid that automatically varies the amount of chemical fed in proportion to variations in the liquid flow rate.

Another object is to prevent a surge of chemical from being fed into a water supply that starts to flow after having been shut down.

Another object is to provide a simple, rugged, non-clogging dispenser for dissolving a solid chemical that is relatively inexpensive and easily maintained, and which does not possess defects found in similar prior art devices.

Other objects and advantages of the invention will be found in the specification and claims and the scope of the invention will be set forth in the claims.

DESCRIPTION OF THE DRAWING

FIG. 1 is a partially cross sectional schematic representation of the invention.

FIG. 2 is a partially broken-away cross sectional view taken generally along the line 2—2 in FIG. 1.

DESCRIPTION OF THE INVENTION

The drawing shows apparatus 10 for treating water by dissolving a solid chemical 11, such as a polyphosphate, into a pressurized stream flowing through conduits 12 and 13. Conduit 12 is screwed into the inlet opening 14 of a fixed housing 15, and conduit 13 is screwed into the outlet opening 16 of housing 15. A generally circular, threaded, downwardly facing opening 17 is housing 15 is located below inlet and outlet openings 14 and 16. Downwardly facing means, such as generally cylindrical tube 19, is connected to outlet opening 16 for providing a flow path to opening 16. Tube 19 is centered in opening 17. A generally cylindrical removable housing 20 has a closed bottom end 21 and an upwardly facing open top end 22 which is threaded into opening 17 of fixed housing 15. A gasket 23 may be used to seal the threaded joint between housing 15 and 20.

A supply of solid chemical 11 is contained in the elongated tubular body portion 24 of a removable, refillable cartridge 25. The closed bottom end 26 of body 24 has a plurality of liquid inlet holes 27. The open end 28 of body 24 is closed by removable cap 30, which has a relatively small liquid outlet hole 31 at its center. A tubular extension 32 protrudes upwardly from the top of cap 30 coaxial with hole 31. A pair of wide slots 33 in extension 32 define a relatively large liquid flow aperture 34 through the extension above hole 31. The liquid flow path through slots 33 should be at least about twenty times large than that through hole 31, and such liquid flow path through slots 33 should be slightly less than that through either of inlet and outlet openings 14 and 16. Means for removably connecting cap 30 to body 24 includes a plurality of equally spaced flexible tabs 35 integral with and projecting beyond the peripheral edge of the cap. Each tab 35 has a tapered shoulder 36 extending from its lower end. Tabs 35 are received in slots 37 defined by ledges 38 that extend from and are integral with body 24. Each slot is enlarged at one end 39 to facilitate insertion of its mating tab 35 until shoulder 36 is below ledge 38. The opposite end 40 of each slot is smaller than enlarged end 39, and the two ends are connected by a still smaller connecting slit 41. After insertion of tabs 35 into ends 39, clockwise rotation of cap 30 will move the tabs through slits 41 into the opposite ends 40 of the slots where shoulders 36 will snap outwardly and be locked into place beneath ledges 38. To remove cap 30, tabs 35 should be pressed inwardly against body 24 until they clear the edge of slits 41; then the cap can be rotated counterclockwise until the tabs are in ends 39, through which they can be moved out of slots 37 by pulling cap 30 away from body 24.

Cartridge 25 is centered and held in housing 20 by a projection 43 that extends upwardly from the bottom 21 of the housing at its center. Projection 43 is received in a mating indentation 44 in the center of cartridge bottom 26. The outside surface 45 of cartridge 25 is spaced from and faces the inside surface 46 of housing 20 so as to define an annular liquid flow passage 47 therebetween. Tubular extension 32 telescopes over tube 19, but tube 19 terminates short of the top of cap 30 so as not to cover a major portion of slots 33. This permits aperture 34 to communicate with outlet opening 16 through tube 19.

All of the water flowing into fixed housing 15 through conduit 12 enters the open top end 22 of removable housing 20. A minor amount of such water in housing 20 flows downwardly through annular passage 47 and into the liquid inlet holes 27 at the bottom end of cartridge 25. This minor amount of water flows upwardly through solid chemical 11 and dissolves some of the chemical. The dissolved chemical and water leave cartrige 25 through outlet hole 31 and enter tubular extension 32. The remainder of the water in housing 20 flows through aperture 34 into extension 32 where it is mixed with the dissolved chemical from cartridge 25. The dissolved chemical and all the water then enter tube 19 and exit from dispenser 10 through outlet opening 16 into conduit 13.

The relatively small hole 31 in the top of cap 30 creates a pressure differential that draws a predetermined volume of water through cartridge 25, and thereby feeds a quantity of chemical 11 within a predetermined range into the water flowing through conduits 12 and 13. If the volume of water flowing through the conduits changes, the water flow through cartridge 25 will change approximately proportionally and will thus maintain the amount of chemical dispensed into the water stream within the predetermined range. For example, when the water pressure is from 20–125 p.s.i. and hole 31 has an area in the range of about 0.120–0.150 sq. in., apparatus in accord with this invention will dispense 5–10 miligrams of polyphosphate per liter of water flowing through conduits 12 and 13.

It has thus been shown that by the practice of this invention a dispenser 10 with no moving parts feeds a consistent amount of dissolvable solid chemical 11 into a liquid stream. By locating the openings in chemical holding cartridge 25 below the liquid inlet and outlet openings 14 and 16, surges in the amount of chemical 11 fed into the liquid stream are prevented when liquid flow is resumed after having been stopped. The chemical 11 which dissolves in the liquid that remains in cartridge 24 when no liquid is flowing through conduits 12 and 13 forms a solution that is denser than the liquid alone, so it stays in the bottom of body 24 and housing 20. When liquid flow resumes, the denser solution flows through hole 31 at a controlled rate into conduit 13, rather than as a surge of all of the dissolved chemical. Cap 30 can be unlocked and removed from body 24, so cartridge 25 can be refilled with chemical 11 and recycled. Or cartridge 25 can be discarded when empty, and then the user need never handle chemical 11.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for dissolving a solid chemical into a pressurized liquid flowing through a conduit, comprising;
   (a) a fixed housing having a liquid inlet opening and a liquid outlet opening connected to said conduit, a downwardly facing opening below said liquid inlet and outlet openings, downwardly facing tubular means in said downwardly facing opening, and said tubular means being connected to said outlet opening;
   (b) a removable housing havings a closed end and an open end, said open end being removably connected to said downwardly facing opening of said fixed housing; and
   (c) a removable cartridge containing a supply of said solid chemical, means for centering and holding said cartridge in said removable housing below said tubular means in said fixed housing, the outside surface of said cartridge being spaced from and facing the inside surface of said removable housing, there being a liquid inlet hole in said cartridge, a relatively small liquid outlet hole at the top of said cartridge, a tubular extension protruding upwardly from the upper end of said cartridge around said liquid outlet hole, said extension being coupled with said tubular means in said fixed housing, there being a relatively large aperture through said extension; whereby all of said liquid flowing through said conduit enters said removable housing, a minor amount of such liquid in said removable housing flowing between said facing surfaces and into said liquid inlet hole of said cartridge, said minor amount of liquid flowing through said solid chemical in said cartridge and dissolving same and then out said liquid outlet hole into said tubular extension, the remainder of said liquid in said removable housing flowing through said aperture into said extension where it is mixed with the dissolved chemical and then enters said tubular means and exits through said outlet opening.

2. The invention defined in claim 1, wherein said open end of said removable housing is threaded into said downwardly facing opening in said fixed housing.

3. The invention defined in claim 1, wherein the coupled portions of said tubular means and said extension are cylindrical and telescope with each other.

4. The invention defined in claim 1, wherein said means for centering and holding said cartridge in said removable housing comprises means projecting upwardly from the bottom of said removable housing that is received in an indentation in the bottom of said cartridge.

5. The invention defined in claim 1, wherein said aperture in said extension comprises a pair of slots located above said relatively small liquid outlet hole.

6. The invention defined in claim 1, wherein said aperture is at least about twenty times larger in area than said relatively small hole, and said aperture is smaller than either of said liquid inlet and liquid outlet openings.

7. The invention defined in claim 6, wherein when said pressure of said liquid is between 20 and 125 p.s.i., the size of said relatively small liquid outlet hole is about 0.120–0.150 sq. in.

8. Apparatus for dissolving a solid chemical into a pressurized liquid flowing through a conduit, comprising;
   (a) a fixed housing having a liquid inlet opening and a liquid outlet opening connected to said conduit, a generally circular threaded, downwardly facing opening below said liquid inlet and outlet openings, downwardly facing generally cylindrical tubular means centered in said downwardly facing opening, and said tubular means being connected to said outlet opening;
   (b) a generally cylindrical removable housing having a closed bottom end and an upwardly facing top open end, said open end being threaded into said downwardly facing opening of said fixed housing; and
   (c) a removable cartridge containing a supply of said solid chemical, centering and holding means projecting upwardly from the bottom center of said removable housing being received in an indentation in the bottom center of said cartridge, the outside surface of said cartridge being spaced from and facing the inside surface of said removable housing so as to define an annular liquid flow passage therebetween, there being liquid inlet holes in said cartridge adjacent its lower end only, a relatively small liquid outlet hole at the top of said cartridge at its center, a tubular extension protruding upwardly from the upper end of said cartridge coaxial with said liquid outlet hole, said extension telescoping over said tubular means in said fixed housing, there being a relatively large aperture through said extension above said liquid outlet hole;

whereby all of said liquid flowing through said conduit enters said removable housing, a minor amount of such liquid in said removable housing flowing downwardly between said facing surfaces and into said liquid inlet holes adjacent the lower end of said cartridge, said minor amount of liquid flowing upwardly through said solid chemical in said cartridge and dissolving same and then out said liquid outlet hole into said tubular extension, the remainder of said liquid in said removable housing flowing through said aperture into said extension where it is mixed with the dissolved chemical and then enters said tubular means and exits through said outlet opening.

* * * * *